United States Patent
Liu

[11] 3,907,401
[45] Sept. 23, 1975

[54] HIGH PERFORMANCE OPTICAL OBJECTIVE

[75] Inventor: Wai-Min Liu, Arleta, Calif.

[73] Assignee: Xerox Corporation, Stamford, Conn.

[22] Filed: July 1, 1974

[21] Appl. No.: 484,725

[52] U.S. Cl. .................................. 350/2; 350/214
[51] Int. Cl.² .................... G02B 9/64; G02B 13/14
[58] Field of Search ............................ 350/2, 214

[56] References Cited
UNITED STATES PATENTS

| | | |
|---|---|---|
| 3,428,386 | 2/1969 | Schlegel .............................. 350/2 |
| 3,744,880 | 7/1973 | Yuta ................................. 350/214 |
| 3,756,697 | 9/1973 | Nakamura ...................... 350/214 X |

*Primary Examiner*—John K. Corbin
*Attorney, Agent, or Firm*—James J. Ralabate; Terry J. Anderson; Irving Keschner

[57] ABSTRACT

A twelve element optical objective which provides a relatively large equivalent focal length and aperture ratio, said objective having high resolving power, while minimizing spherical and chromatic aberrations.

6 Claims, 1 Drawing Figure

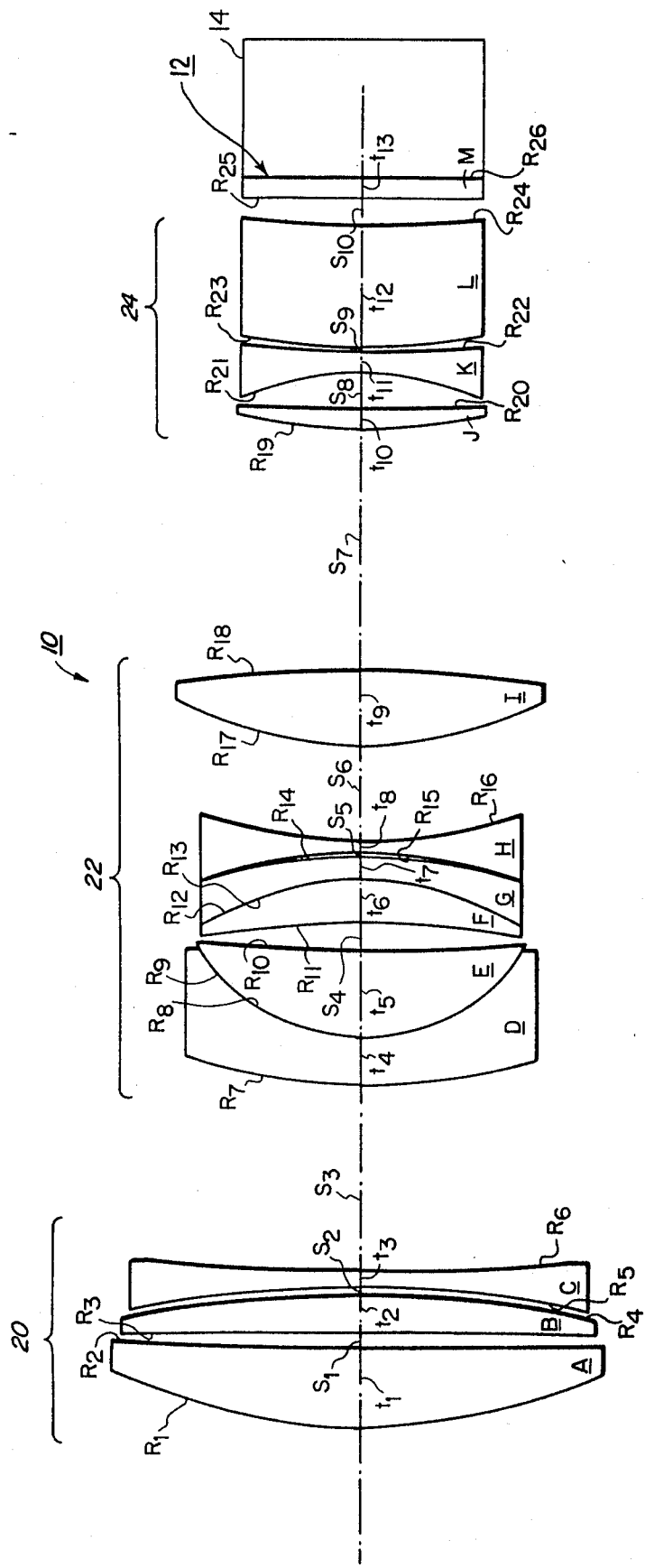

HIGH PERFORMANCE OPTICAL OBJECTIVE

BACKGROUND OF THE INVENTION

Prior art techniques for obtaining a lens which is adapted for use as a reconnaissance objective have included the utilization of a relatively short equivalent focal length and small aperture, a relatively short equivalent focal length and smaller image format, or a relatively large equivalent focal length with a smaller aperture. Thus, prior art techniques were limited, either by smaller apertures or shorter effective focal lengths.

Lenses which provide relatively large aperture ratios and equivalent focal lengths while minimizing the distortion and aberrations associated with such a lens, features which are particularly desirable in a reconnaissance or camera objective, have been the subject of extensive prior art investigations.

A high quality lens, in addition to having a relatively high equivalent focal length and large aperture ratio, would also require a relatively high modulation transfer function. However, since lens aberrations are proportional to the equivalent focal length, a large equivalent focal length lens or objective requires a particular choice of lens material (i.e., glass) to correct for primary and secondary color aberrations. However, the diameter of a lens which is to provide a large equivalent focal length (24.0 inches for illustrative purposes) and a relatively large aperture ratio (i.e., F/2) limits the choice of glass because, in general, fabrication of glass to the required diameter (12 inches, for example) is relatively complex and expensive.

SUMMARY OF THE PRESENT INVENTION

The present invention provides an objective, particularly useful for low light level reconnaissance objectives and camera objectives, which has a relatively large equivalent focal length while at the same time providing a relatively large aperture. The utilization of a large equivalent focal length objective allows the objective to cover a relatively large image format with the same field of view provided by an objective having a smaller equivalent focal length. An objective having a relatively high aperture ratio will collect more light than an objective having a smaller aperture ratio.

The present invention, in particular, provides an objective comprising 12 elements, the objective having, in a particular embodiment, a 24-inch equivalent focal length and a F/2 aperture ratio. The objective is achromatic over the spectrum from approximately 7,000A to 9,000A, provides a field of view of approximately 15°, an image format of 4.5 inches × 4.5 inches, distortion of less than 0.20 mm at full field and a modulation transfer function of greater than 70 percent at a resolving power of 30.0 lp/m over the entire image format.

It is an object of the present invention to provide an objective which provides a relatively large equivalent focal length while providing a relatively large aperture ratio.

It is a further object of the present invention to provide an objective which provides a relatively large equivalent focal length while providing a relatively large aperture ratio, the objective also providing high resolving power with a minimum of spherical and chromatic aberration, the wave length range thereof being from approximately 7000A to about 9000A.

It is still a further object of the present invention to provide a 12 element objective which provides a relatively large equivalent focal length while providing a relatively large aperture ratio.

DESCRIPTION OF THE DRAWING

For a better understanding of the invention, as well as other objects and further features thereof, reference is made to the following description which is to be read in conjunction with the following drawing wherein:

The sole Figure is an optical diagram of an embodiment of the invention.

DESCRIPTION OF THE PREFERRED EMBODIMENT

The sole Figure is an optical diagram of an embodiment of the present invention.

Referring now to the drawing, the objective, or lens assembly, as a whole is designated by the reference numeral 10, the image plane being designated by the reference numeral 12. The image is viewed by the objective initially by a lens element A and thereafter optically transmitted through to element M.

Objective 10 is made up of three fixed lens groups, the front lens group being identified by reference numeral 20, the second lens group by reference numeral 22, and the third lens group by reference numeral 24.

Lens group 20 comprises positive lens element A which is spaced in front of positive meniscus lens element B which is spaced from in front of negative lens element C. The second fixed lens group 22 comprises a doublet lens element comprising negative meniscus lens element D, the rear surface of which is cemented to positive lens element E convex to the front. The aforementioned doublet is spaced in front of a second doublet element comprising positive meniscus lens F, the rear surface of which is cemented to the front surface of negative meniscus lens element G concave to the front. The second doublet is spaced in front of biconcave lens element H which is spaced in front of positive lens element I convex to the front.

The third fixed lens group 24 comprises positive meniscus element J convex to the front spaced in front of lens element K concave to the front, said lens element K being spaced in front of positive meniscus lens element L convex to the front.

M is a flat plate glass element provided for an image tube, such as an image intensifier tube, the image tube intensifying the image viewed by the objective 10. Element M in the embodiment illustrated comprises the window for image intensifier tube 14. The image viewed initially by lens element A is formed at image plane 12 which is, in the illustrated embodiment, located at the rear surface of element M.

When objective 10 is utilized with an image intensifier tube, the IR image viewed by the objective is formed at image plane 12. The image is then intensified and converted to a visible image by image intensifier tube 14.

The following chart is an example of constructural data for the preferred embodiment of the present invention.

In the chart, the radii of curvature R, the thickness $t$, the spacings S, the indices of refraction Nd and the Abbé numbers V are all expressed in their customary manner.

The aforementioned objective provides a lens design which has a relatively large equivalent focal length and aperture ratio while minimizing the effects of spherical and chromatic aberrations. Additionally, distortion is maintained at a relatively low value while the resolving power of the objective is at least 30 lp/mm at a modulation transfer function of 70 percent or greater over the entire image format.

CHART I

| GROUP | LENS | RADIUS | THICKNESS | SPACING | Nd | Vd | GLASS CODE | GLASS MATERIAL |
|---|---|---|---|---|---|---|---|---|
| 20 | A | $R_1=16.7783$ $R_2=290.0629$ | $t_1=2.123$ | | 1.607381 | 56.65 | 607567 | SK2 |
| | B | $R_3=-583.7826$ $R_4=-32.8113$ | $t_2=0.980$ | $S_1=.382$ | 1.607381 | 56.65 | 607567 | SK2 |
| | C | $R_5=-32.4812$ $R_6=79.5851$ | $t_3=0.437$ | $S_2=0.217$ | 1.620962 | 35.90 | 621359 | F11 |
| 22 | D | $R_7=17.0592$ $R_8=5.5057$ | $t_4=1.314$ | $S_3=5.154$ | 1.653319 | 39.71 | 653397 | K2FS5 |
| | E | $R_9=5.5057$ $R_{10}=49.0213$ | $t_5=2.370$ | | 1.622801 | 56.90 | 623569 | SK10 |
| | F | $R_{11}=26.9709$ $R_{12}=-8.4069$ | $t_6=1.198$ | $S_4=0.765$ | 1.626061 | 38.96 | 626390 | BASF1 |
| | G | $R_{13}=-8.4069$ $R_{14}=-15.5050$ | $t_7=0.567$ | | 1.568730 | 63.08 | 569631 | PSK2 |
| | H | $R_{15}=-13.6898$ $R_{16}=14.2188$ | $t_8=0.301$ | $S_5=0.139$ | 1.620962 | 35.90 | 621359 | F11 |
| | I | $R_{17}=11.1109$ $R_{18}=-46.4378$ | $t_9=2.007$ | $S_6=2.545$ | 1.677900 | 55.20 | 678552 | LAKN12 |
| 24 | J | $R_{19}=16.0579$ $R_{20}=71.2636$ | $t_{10}=0.539$ | $S_7=6.664$ | 1.626061 | 38.96 | 626390 | BASF1 |
| | K | $R_{21}=-8.5091$ $R_{22}=36.1164$ | $t_{11}=0.555$ | $S_8=0.971$ | 1.698951 | 30.07 | 699301 | SF15 |
| | L | $R_{23}=16.7727$ $R_{24}=30.5301$ | $t_{12}=3.306$ | $S_9=0.101$ | 1.784701 | 26.08 | 785261 | SF56 |
| | M | $R_{25}=0.0000$ $R_{26}=0.0000$ | $t_{13}=0.500$ | $S_{10}=0.900$ | 1.48605 | 69.44 | 7056 | CORNING |

NOTE: F.O.V. = 15°; F/Number = F/2.0; E.F.L. = 24.0.
All dimensions in inches. Stop diameter is 9.8 inches located 1.3451 inches from lens element C.

Other characteristics of the objective described hereinabove include a field of view of approximately 15.0° and an achromatic response over the spectrum of 7000A to 9000A. This later characteristic is useful in that the objective may be utilized as a low light level reconnaissance objective with an image intensifier tube.

While the invention has been described with reference to its preferred embodiment, it will be understood by those skilled in the art that various changes may be made and equivalents substituted for elements thereof without departing from the true spirit and scope of the invention. In addition, many modifications may be made to adapt a particular situation or material to the teachings of the invention without departing from its essential teachings.

What is claimed is:

1. An optical objective comprising three fixed groups of lens elements, the front fixed lens group comprising a positive lens element which is spaced in front of a positive meniscus lens element which is spaced in front of a negative lens element concave to the front, the second fixed lens group comprising a doublet lens element comprising a negative meniscus lens element the rear surface of which is cemented to a first positive lens element convex to the front spaced in front of a second doublet element comprising a positive meniscus lens the rear surface of which is cemented to the front surface of a negative meniscus lens element concave to the front which is spaced in front of a biconcave lens element which is spaced in front of a second positive lens element convex to the front, and the third fixed lens group comprising a positive meniscus element convex to the front spaced in front of a negative lens element concave to the front spaced in front of a third positive meniscus lens element convex to the front.

2. The objective as defined in claim 1 wherein said objective is achromatic over the spectrum from about 7000A to about 9000A.

3. The objective as defined in claim 1 wherein the equivalent focal length is 24.0 inches and the F/number is 2.0.

4. The objective as defined in claim 1 wherein distortion is less than 0.20 mm at full field and the modulation transfer function is at least equal to 70 percent at a resolving power of 30 lp/mm.

5. The objective as defined in claim 1 further including an image tube operatively associated with said objective.

6. An optical objective made in accordance with the following chart of constructional data:

| GROUP | LENS | RADIUS | THICKNESS | SPACING |
|---|---|---|---|---|
| 20 | A | $R_1=16.7783$<br>$R_2=290.0629$ | $t_1=2.123$ | |
| | | | | $S_1=.382$ |
| | B | $R_3=-583.7826$<br>$R_4=-32.8113$ | $t_2=0.980$ | |
| | | | | $S_2=0.217$ |
| | C | $R_5=-32.4812$<br>$R_6=79.5851$ | $t_3=0.437$ | |
| | | | | $S_3=5.154$ |
| 22 | D | $R_7=17.0592$<br>$R_8=5.5057$ | $t_4=1.314$ | |
| | E | $R_9=5.5057$<br>$R_{10}=49.0213$ | $t_5=2.370$ | |
| | | | | $S_4=0.765$ |
| | F | $R_{11}=26.9709$<br>$R_{12}=-8.4069$ | $t_6=1.198$ | |
| | G | $R_{13}=-8.4069$<br>$R_{14}=-15.5050$ | $t_7=0.567$ | |
| | | | | $S_5=0.139$ |
| | H | $R_{15}=-13.6898$<br>$R_{16}=14.2188$ | $t_8=0.301$ | |
| | | | | $S_6=2.545$ |
| | I | $R_{17}=11.1109$<br>$R_{18}=-46.4378$ | $t_9=2.007$ | |
| | | | | $S_7=6.664$ |
| 24 | J | $R_{19}=16.0579$<br>$R_{20}=71.2636$ | $t_{10}=0.539$ | |
| | | | | $S_8=0.971$ |
| | K | $R_{21}=-8.5091$<br>$R_{22}=36.1164$ | $t_{11}=0.555$ | |

-Continued

| GROUP | LENS | RADIUS | THICKNESS | SPACING |
|---|---|---|---|---|
| | | | | $S_9=0.101$ |
| | L | $R_{23}=16.7727$<br>$R_{24}=30.5301$ | $t_{12}=3.306$ | |

| Nd | Vd | GLASS CODE | GLASS MATERIAL |
|---|---|---|---|
| 1.607381 | 56.65 | 607567 | SK2 |
| 1.607381 | 56.65 | 607567 | SK2 |
| 1.620962 | 35.90 | 621359 | F11 |
| 1.653319 | 39.71 | 653397 | K2FS5 |
| 1.622801 | 56.90 | 623569 | SK10 |
| 1.626061 | 38.96 | 626390 | BASF1 |
| 1.568730 | 63.08 | 569631 | PSK2 |
| 1.620962 | 35.90 | 621359 | F11 |
| 1.677900 | 55.20 | 678552 | LAKN12 |
| 1.626061 | 38.96 | 626390 | BASF1 |
| 1.698951 | 30.07 | 699301 | SF15 |
| 1.784701 | 26.08 | 785261 | SF56 |

NOTE: F.O.V. = 15°; F/Number = F/2.0; E.F.L. = 24.0.
All dimensions in inches. Stop diameter is 9.8 inches located 1.3451 inches from lens element C.

* * * * *